(12) United States Patent
Raszga et al.

(10) Patent No.: US 7,249,457 B2
(45) Date of Patent: Jul. 31, 2007

(54) HYDRAULIC GRAVITATIONAL LOAD ENERGY RECUPERATION

(75) Inventors: Calin L. Raszga, Woodstock (CA); Ulf Bergquist, Woodstock (CA); Jeffrey R. Girard, Woodstock (CA)

(73) Assignee: Timberjack Inc., Ontario (CA)

( * ) Notice: Subject to any disclaimer, the term of this patent is extended or adjusted under 35 U.S.C. 154(b) by 0 days.

(21) Appl. No.: 11/355,604

(22) Filed: Feb. 16, 2006

(65) Prior Publication Data

US 2006/0185355 A1 Aug. 24, 2006

Related U.S. Application Data

(60) Provisional application No. 60/654,410, filed on Feb. 18, 2005.

(51) Int. Cl.
*F15B 21/14* (2006.01)
*E02F 9/22* (2006.01)

(52) U.S. Cl. .............................. 60/419; 60/414; 417/16

(58) Field of Classification Search ................. 60/413, 60/414, 417, 419, 427, 428, 461; 91/420; 417/16, 323
See application file for complete search history.

(56) References Cited

U.S. PATENT DOCUMENTS

| | | | |
|---|---|---|---|
| 2,932,257 A | 4/1960 | Lupin | |
| 4,412,600 A | 11/1983 | Ito et al. | |
| 4,723,107 A | 2/1988 | Schmid | |
| 4,928,487 A | 5/1990 | Nikolaus | |
| 5,046,309 A | 9/1991 | Yoshino | |
| 5,794,442 A * | 8/1998 | Lisniansky | 60/414 |
| 5,827,051 A | 10/1998 | Smith | |
| 5,852,933 A | 12/1998 | Schmidt | |
| 5,878,569 A | 3/1999 | Satzler | |
| 6,151,894 A | 11/2000 | Endo et al. | |
| 6,460,332 B1 * | 10/2002 | Maruta et al. | 60/414 |
| 6,681,818 B2 * | 1/2004 | Kurelek | 60/428 |
| 7,086,226 B2 * | 8/2006 | Oguri | 60/414 |

* cited by examiner

*Primary Examiner*—Thomas E. Lazo
(74) *Attorney, Agent, or Firm*—Quarles & Brady LLP

(57) ABSTRACT

A hydraulic system has gravitional load energy recuperation by opening a recuperation piloted valve with a pilot pressure supplied by a hydraulic pump so as to drive a recuperation hydraulic motor with a source of fluid pressurized by gravity from the load. The recuperation hydraulic motor drives the mechanical drive train of the prime mover that drives the pump that supplies the load, and other pumps that supply other loads.

16 Claims, 2 Drawing Sheets

HYDRAULIC GRAVITATIONAL LOAD ENERGY RECUPERATION

CROSS-REFERENCE TO RELATED APPLICATION

This claims the benefit of U.S. Provisional Patent Application No. 60/654,410 filed Feb. 18, 2005.

STATEMENT CONCERNING FEDERALLY SPONSORED RESEARCH OR DEVELOPMENT

Not applicable.

FIELD OF THE INVENTION

This invention relates to hydraulic energy conservation, and in particular to a system that uses hydraulic energy that would otherwise be wasted to supplement the power produced by a prime mover.

BACKGROUND OF THE INVENTION

Many types of modern hydraulic machines, including forestry machines, excavators, and material handlers, will often lift large loads and then at some later time lower them in a controlled fashion. To perform this lowering, hydraulic fluid, under pressure, will be allowed to leave the hydraulic cylinder(s) holding the load in an elevated position. This fluid will be passed through an orifice, such as a control valve, and the hydraulic pressure will be converted into heat. Thus, much of the original energy used to elevate the load is lost.

These machines will typically be performing other hydraulic functions, such as boom rotation or machine travel, at the same time as the load is lowering. This will be accomplished by generating hydraulic fluid pressure by using a prime mover, such as a diesel or gasoline engine, to propel a hydraulic pump. Thus the machine is regularly converting stored pressure into heat, and at the same time creating new pressurized fluid to perform these other hydraulic functions.

SUMMARY OF THE INVENTION

The invention provides a hydraulic power system having a prime mover with a shaft that drives one or more hydraulic pumps that supply hydraulic fluid under pressure to a control valve that is operated to direct fluid from the pump to a load and to direct return fluid under pressure that is being returned from the load. Hydraulic fluid under pressure from the pump is directed in at least one position of the valve to place the return fluid into communication with a recuperation motor so as to drive the recuperation motor to turn a shaft that is mechanically connected to relieve at least part of the work required of the prime mover to drive the hydraulic system. This conserves energy that would otherwise be wasted in the pressure drop of the return fluid and reduces wear and tear on the prime mover.

In a preferred form the valve applies a pressure to a pilot pressure port of a piloted valve that communicates the return fluid to the recuperation motor. The recuperation motor may be either a fixed displacement hydraulic motor or a variable displacement hydraulic motor, which would better enable matching the speed of the recuperation motor so as to drive the pumps being driven by the prime mover and thereby relieve the load on the prime mover. It can do this by driving the drive shaft of the prime mover, and the prime mover can drive the pump that provides hydraulic fluid under pressure to the load and at least one other pump that provides hydraulic fluid under pressure to a different load.

In another aspect of the invention, a hydraulic system of the invention is advantageously applied to a tree feller having a felling head supported by a boom and boom control cylinders that operate to lift, lower, extend and retract the boom and having a hydraulic power system that includes a prime mover with a shaft that drives one or more hydraulic pumps to supply hydraulic fluid under pressure to a control valve that is operated to direct fluid from the pump to at least one of the boom control cylinders that is subjected to a gravitational load on the boom and to direct return fluid under pressure that is being returned from the cylinder. A recuperation valve places fluid that is compressed out of the boom control cylinder by the influence of gravity on the boom into communication with a recuperation motor that turns a shaft to relieve at least part of the work exerted by the prime mover to drive the hydraulic system.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
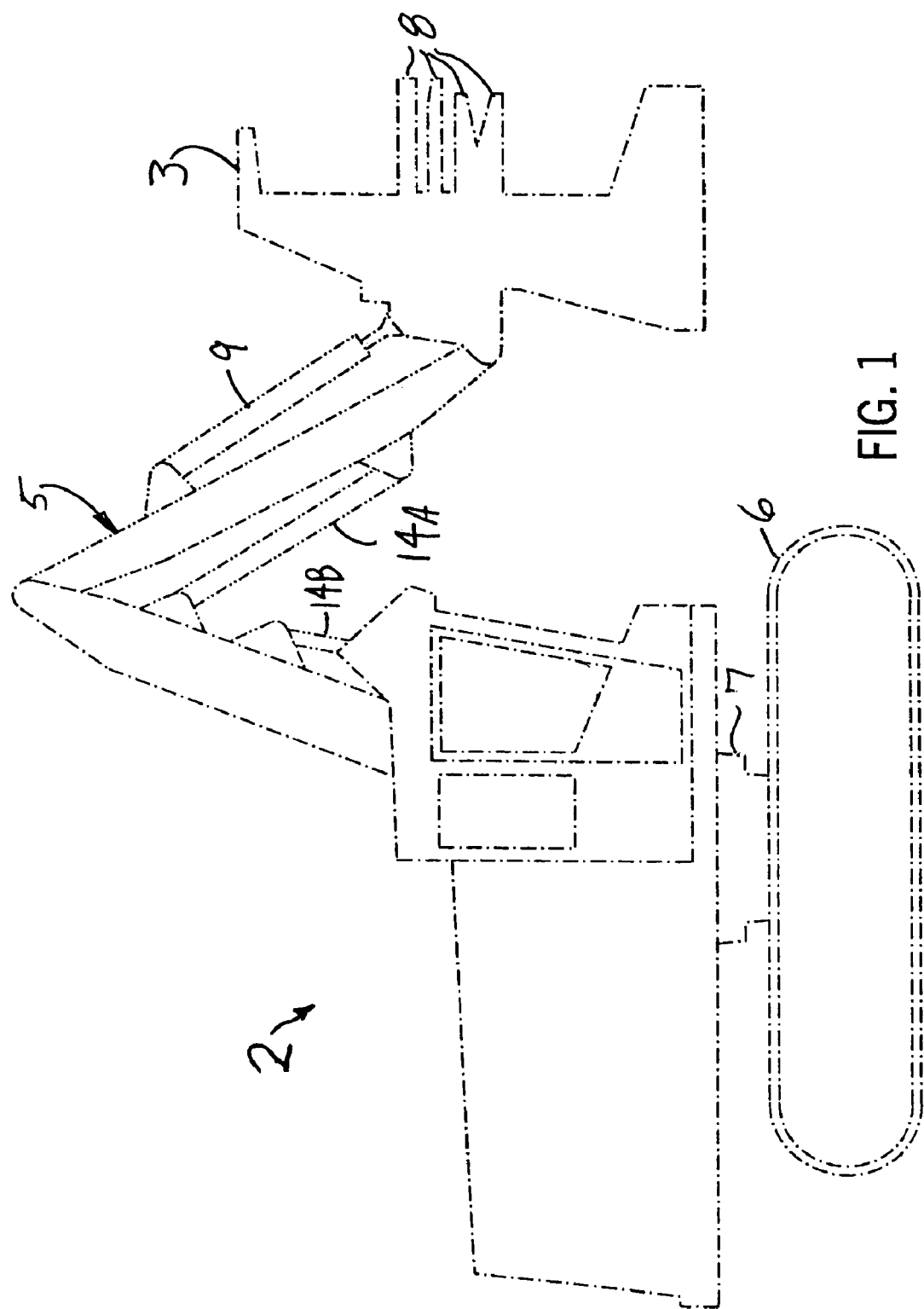
FIG. 1 is a schematic view of a tree feller buncher having a hydraulic cylinder operated boom.
Figure 2:
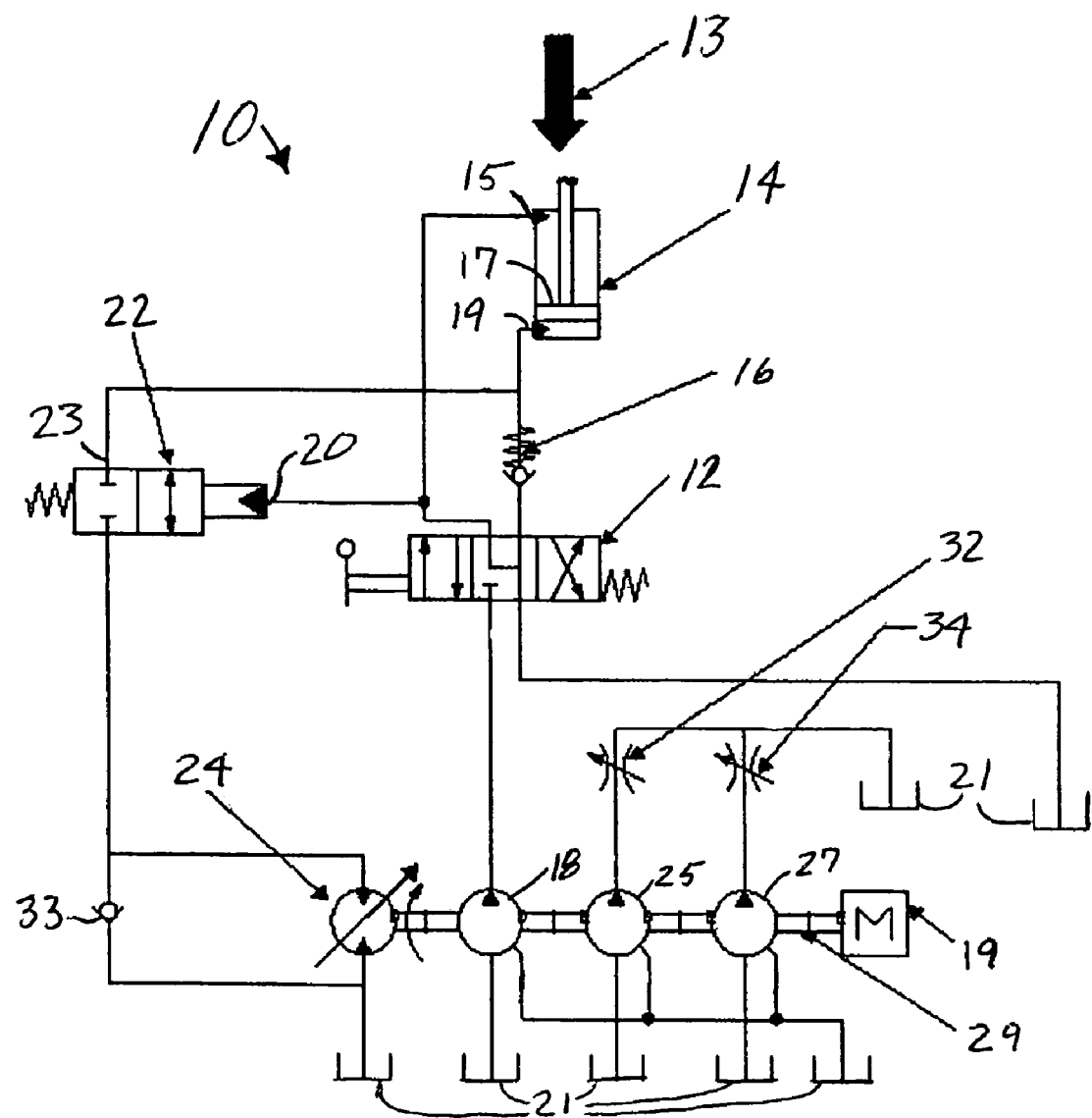
FIG. 2 is a schematic view of a hydraulic system incorporating the invention.

Referring to FIG. 2, in operation, a hydraulic circuit 10 has an open center directional control valve 12 that, as shown in the illustration, may be in one of three positions operated manually, although it could be electrically or hydraulically operated. The valve 12 controls the flow of fluid to and from hydraulic cylinder 14. Pressurized hydraulic fluid is supplied to the cylinder 14 from pump 18 which is driven by prime mover 19, that is, in the case of a tree feller, an internal combustion engine. The cylinder 14 may be a cylinder 14A or 14B (or both) that moves a boom 5 of a tree feller buncher as illustrated in FIG. 1, a ram or other moving part of a machine up and down, or another hydraulic device that works against gravity in one direction and with gravity in the other direction. In a tree feller buncher 2 as illustrated in FIG. 1, the saw head 3 is supported at an end of the boom 5, which is moved up and down and extended with the hydraulic cylinders 14A, 14B (more than one cylinder may be provided at each pivot location) and the force of gravity working on the boom 5 can be significant, including the combined weight of the boom 5, the saw head 3 and the cut trees (not shown) accumulated and supported on the saw head 3. The prime mover 19 also drives other hydraulic pumps 25, 27 that supply other loads, for example the drive motors that turn the wheels or tracks 6 of the feller 2, the rotary table 7 on which the boom is mounted, the saw motor, saw harvesting and accumulating arms 8, the saw head rotation and tilt cylinders 9, etc. Variable restrictions 32 and 34 are illustrated in FIG. 2 to represent these other loads. The drive of the pumps 18, 25 and 27 is via a common shaft or mechanical transmission 29, which may also be referred to as the drive train 29, and in the preferred embodiment they are all driven by the same prime mover 19.

In FIG. 2, the hydraulic pressure introduced into the top port 15 of the cylinder 14 works with the force of gravity 13 to move the piston 17 of the cylinder 14 down, and therefore may be referred to as a gravity assisted port, and the hydraulic pressure introduced into the bottom port 19 of the cylinder 14 works against the force of gravity 13 to move the piston 17 up, and therefore may be referred to as an anti-gravity port. When hydraulic pressure is introduced into the gravity assisted port 15 of the cylinder 14 by the operation of the valve 12 and pump 18 driven by prime mover 19, hydraulic fluid is forced out of the anti-gravity port 19 of cylinder 14 by the combined forces of the hydraulic pressure introduced into the port 15 of the cylinder 14 and the force of gravity 13 acting on the piston 17.

In the center position of the valve 12, as illustrated, a gravitational load 13 on the hydraulic cylinder 14 creates high pressure in the bottom of the cylinder 14 and no or very low pressure is introduced into the top of the cylinder, the top of the cylinder 14 being vented to tank 21 through the valve 12. Pilot port 20 of normally closed (or off) recuperation piloted valve 22 is also in communication with the gravity assisted port of the cylinder 14 so that when the gravity assisted port is pressurized, valve 20 opens. In the center position of the valve 12, therefore, both the gravity assisted port 15 of cylinder 14 and the pilot port 20 of valve 22 are vented to tank through the valve 12, so the valve 22 is off. Control port 23 of valve 22 is in communication with anti-gravity port 19 so that valve 22, under control of valve 12, controls the return flow from port 19 under the influence of gravity.

The high pressure generated in the bottom of the cylinder 14 when the valve 12 is in the center position closes the check valve 16, and the load 13 will not move. Also, in this position of the valve 12, the valve 20 is closed so the pressure from port 19 is disconnected from communication with the pump 24. When the valve 12 is moved toward the left from the center position, pump 18 pressure opens the check valve 16, pressurized fluid is supplied to the bottom of the cylinder 14 via port 19 and the load is moved higher. When the valve 12 is moved toward the right from the center position, pump pressure is supplied to port 15 of the cylinder 14, and to the pilot port 20 of the recuperation piloted valve 22. The recuperation valve 22 then opens, or turns on. As gravity plus the pump pressure applied to the gravity assisted port 15 of the cylinder 14 starts to move the cylinder 14 piston down, the fluid from the anti-gravity port 19 of the cylinder 14 passes through the recuperation piloted valve 22, to the recuperation hydraulic motor 24, that may be either a fixed displacement motor or a variable displacement motor. If a variable displacement motor is used, the displacement of the motor can be adjusted to adjust the speed of the output shaft of the motor 24 and thus the speed that it drives the prime mover/pump drive train. Check valve 33 prevents flow directly to tank 21 and so the flow from valve 22 is directed to recuperation motor 24 to power the motor 24. The motor 24 converts the fluid flow into rotational energy, which reduces the load on the prime mover 19 since the output shaft of the motor 24 is entrained in the drive train that includes the prime mover output shaft and the input shafts of the pumps 18, 25 and 27. In other words, the motor 24 helps the prime mover 19 drive the pump 18, which is supplying the load 13, and also the other pumps 25, 27 that are supplying other loads. In practice, the operator will only move the control valve 12 very slightly to start lowering the load 13, so the energy recovered through the recuperation piloted valve 22 and the recuperation hydraulic motor 24 will greatly exceed the energy coming from the pump 18 to the top of the cylinder 14.

By directing the gravity produced flow to a motor, the energy can be recovered to drive any, or all, of the other regular hydraulic circuits. Even if none of the other regular circuits are in use while the load is lowering, the recovered energy will help the engine overcome the idle torque of the main pumps, and thus decrease fuel consumption.

A preferred embodiment of the invention has been described in considerable detail. Many modifications and variations to the preferred embodiment described will be apparent to a person of ordinary skill in the art. Therefore, the invention should not be limited to the embodiment described.

We claim:

1. In a hydraulic power system having a prime mover with a shaft that drives one or more hydraulic pumps that supply hydraulic fluid under pressure to a control valve that is operated to direct fluid from the pump to a load and to direct return fluid under pressure that is being returned from the load, the improvement wherein hydraulic fluid under pressure from said pump is directed in at least one position of said valve to place said return fluid into communication with a recuperation motor so as to drive said recuperation motor to turn a shaft that is mechanically connected to relieve at least part of the work required of the prime mover to drive the hydraulic system.

2. The improvement of claim 1, wherein said valve in said at least one position applies a pressure to a pilot pressure port of a piloted valve that communicates the return fluid to the recuperation motor.

3. The improvement of claim 1, wherein the recuperation motor is a fixed displacement hydraulic motor.

4. The improvement of claim 1, wherein the recuperation motor is a variable displacement hydraulic motor.

5. The improvement of claim 1, wherein the prime mover drives the pump that provides hydraulic fluid under pressure to the load and at least one other pump that provides hydraulic fluid under pressure to a different load.

6. The improvement of claim 1, wherein the shaft that the recuperation motor turns is connected to drive a drive shaft of the prime mover.

7. The improvement of claim 1, wherein the shaft that the recuperation motor turns is connected to drive an input shaft of at least one hydraulic pump.

8. The improvement of claim 1, wherein at least one of the hydraulic pumps driven by the recuperation motor is a hydraulic pump other than the hydraulic pump that supplies the load.

9. The improvement of claim 8, wherein the recuperation motor also drives the hydraulic pump that supplies the load.

10. The improvement of claim 1, wherein the shaft that the recuperation motor turns drives an input shaft of at least one hydraulic pump, and said input shaft of said hydraulic pump is also driven by a prime mover.

11. The improvement of claim 1, wherein the shaft that the recuperation motor turns drives a plurality of hydraulic pumps, and said plurality of hydraulic pumps are also driven by a prime mover.

12. A hydraulic power system, comprising:
a prime mover;
at least a first hydraulic pump and a second hydraulic pump, each of said pumps being driven by said prime mover to produce a flow of pressurized hydraulic fluid, the first pump;

a hydraulic device that resists a gravitational load, said device having a gravity assisted port to which the introduction of hydraulic fluid from a pump under pressure is assisted by the influence of gravity on the load and an anti-gravity port to which the introduction of hydraulic fluid under pressure is resisted by the influence of gravity on the load;

a hydraulic valve that may be operated by an operator of the system in communication with the gravity assisted port of the device to control a supply flow of pressurized hydraulic fluid from the first pump to the gravity assisted port of the device;

a recuperation valve having a control port in communication with the anti-gravity port of the hydraulic device to control the flow of pressurized hydraulic fluid from the anti-gravity port of the device;

a hydraulic motor connected to assist the prime mover to drive at least the second pump;

wherein the recuperation valve communicates the anti-gravity port of the device with the hydraulic motor to drive the hydraulic motor with the return flow from the anti-gravity port of the device when the hydraulic valve is operated to provide the supply flow from the first pump to the gravity assisted port of the device.

13. A hydraulic system as claimed in claim 12, wherein the recuperation valve is a pilot pressure operated valve having a pilot port in communication with the gravity assisted port of the hydraulic device.

14. A tree feller having a felling head supported by a boom and boom control cylinders that operate to lift, lower, extend and retract the boom and having a hydraulic power system that includes a prime mover with a shaft that drives one or more hydraulic pumps to supply hydraulic fluid under pressure to a control valve that is operated to direct fluid from the pump to at least one of the boom control cylinders that is subjected to a gravitational load on the boom and to direct return fluid under pressure that is being returned from the cylinder, the improvement wherein a recuperation valve is turned on to place fluid that is compressed out of the boom control cylinder by the influence of gravity on the boom into communication with a recuperation motor that turns a shaft to relieve at least part of the work exerted by the prime mover to drive the hydraulic system.

15. The improvement of claim 14, wherein the recuperation valve is turned on in response to pressurizing the boom control cylinder to lower a gravitational load on the boom.

16. The improvement of claim 14, wherein the recuperation motor has an output shaft that is entrained in a drive train that includes an output shaft of the prime mover.

* * * * *